United States Patent
Onose et al.

(10) Patent No.: US 8,186,067 B2
(45) Date of Patent: May 29, 2012

(54) PORTABLE CIRCULAR SAW HAVING LIGHT IRRADIATION UNIT

(75) Inventors: Miyoji Onose, Hitachinaka (JP); Hideaki Terashima, Hitachinaka (JP); Shinji Takano, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 401 days.

(21) Appl. No.: 11/677,601

(22) Filed: Feb. 22, 2007

(65) Prior Publication Data

US 2007/0193039 A1    Aug. 23, 2007

(30) Foreign Application Priority Data

Feb. 22, 2006  (JP) ................................ P2006-045944

(51) Int. Cl.
*B25B 23/18* (2006.01)
*B23D 45/16* (2006.01)
(52) U.S. Cl. ............... 30/377; 30/371; 30/388; 83/520; 362/119
(58) Field of Classification Search ............ 30/388–391, 30/166.3, 370, 371, 375–377, 514; 83/520, 83/521; 362/119
See application file for complete search history.

(56) References Cited

U.S. PATENT DOCUMENTS

| | | | |
|---|---|---|---|
| 4,257,297 A * | 3/1981 | Nidbella | 83/471.3 |
| 5,996,460 A | 12/1999 | Waite | |
| 2001/0029819 A1 * | 10/2001 | Okouchi | 83/13 |
| 2002/0131267 A1 * | 9/2002 | Van Osenbruggen | 362/109 |
| 2003/0047050 A1 * | 3/2003 | Onose et al. | 83/469 |
| 2003/0233921 A1 * | 12/2003 | Garcia et al. | 83/520 |
| 2007/0017326 A1 * | 1/2007 | Long et al. | 83/13 |

FOREIGN PATENT DOCUMENTS

| | | |
|---|---|---|
| DE | 10 2004 026 402 | 12/2005 |
| GB | 2414541 | 11/2005 |
| JP | 11-170203 | 6/1999 |
| JP | 2002-210703 | 7/2002 |
| JP | 2004-042173 | 2/2004 |
| JP | 2004-42173 | 2/2004 |
| JP | 2004-284013 | 10/2004 |
| JP | 2004-330657 | 11/2004 |
| WO | WO 99/02310 | 1/1999 |

OTHER PUBLICATIONS

Office Action in DE 102007007841.4, dated Jan. 17, 2012 (in German); [with English language translation].

* cited by examiner

*Primary Examiner* — Phong Nguyen
(74) *Attorney, Agent, or Firm* — Antonelli, Terry, Stout & Kraus, LLP.

(57) ABSTRACT

A portable circular saw includes a housing, including a motor, a circular saw blade, a saw cover, and a light irradiation unit. The blade is driven by the motor for cutting in a cutting direction. The circular saw blade has one side surface and another side surface. The saw cover is provided to the housing for partially covering the circular saw blade. The light irradiation unit is provided on the saw cover. The light irradiation unit includes a first irradiation device located on the one side surface side of the blade and a second irradiation device located on the another side surface side of the blade for emitting a light to illuminate a region including a leading end portion of the circular saw blade and a spot on the cutting object. The spot is ahead of the leading end portion in the cutting direction.

16 Claims, 5 Drawing Sheets

PORTABLE CIRCULAR SAW HAVING LIGHT IRRADIATION UNIT

BACKGROUND OF THE INVENTION

1. Field of the Invention

The present invention relates to a portable circular saw, and more particularly to a portable circular saw with a light irradiation unit.

2. Description of the Related Art

There is a conventional potable circular saw in which a cutting device for cutting and processing a cutting object such as a wood and the like has portability. This type of portable circular saw mainly includes a circular saw blade and a motor as a driving unit. Therefore, the portable circular saw has good portability and is generally used not only in factories but also at construction site or the like.

At construction site or the like, since work environment such as sufficient brightness cannot always be ensured, visibility of marking lines drawn on a cutting object deteriorates. Commonly in portable circular saws, the motor is provided protruding in a direction lateral to side surface of the cutting blade. In the side providing the motor, the motor shields light from ceiling lamps or the like and casts shadows, thereby deteriorating the visibility of marking lines. To overcome this problem, the present applicant discloses portable circular saws in Japanese Patent Publication No. 11-170203 and Japanese Patent Publication No. 2002-210703. The disclosed portable circular saws are provided with a light irradiation unit to illuminate a blade edge of a circular saw blade.

SUMMARY OF THE INVENTION

Since the portable circular saws disclosed in Japanese Patent Publication No. 11-170203 and Japanese Patent Publication No. 2002-210703 have a light irradiation unit, marking lines drawn on cutting objects are visible even at construction site or the like with insufficient light. However, since the lighting direction of the light irradiation unit on the cutting object is only one direction, the lightened cutting blade casts a shadow thereby deteriorating the visibility of marking lines.

In view of the foregoing, it is an object of the present invention to provide a portable circular saw that improves the visibility of marking lines and has an excellent operating efficiency.

In order to attain the above and other objects, the present invention provides a portable circular saw including a housing, a motor, a circular saw blade, a saw cover, and a light irradiation unit. The motor is accommodated in the housing. The circular saw blade is driven by the motor for cutting a cutting object in a cutting direction. The circular saw blade has one side surface and another side surface. The saw cover is provided to the housing for partially covering the circular saw blade. The light irradiation unit is provided on the saw cover. The light irradiation unit includes a first irradiation device located on the one side surface side of the circular saw blade and a second irradiation device located on the another side surface side of the circular saw blade for emitting a light to illuminate a region including a leading end portion of the circular saw blade and a spot on the cutting object. The spot is ahead of the leading end portion in the cutting direction.

DETAILED DESCRIPTION OF THE PREFERRED EMBODIMENTS

Figure 1:
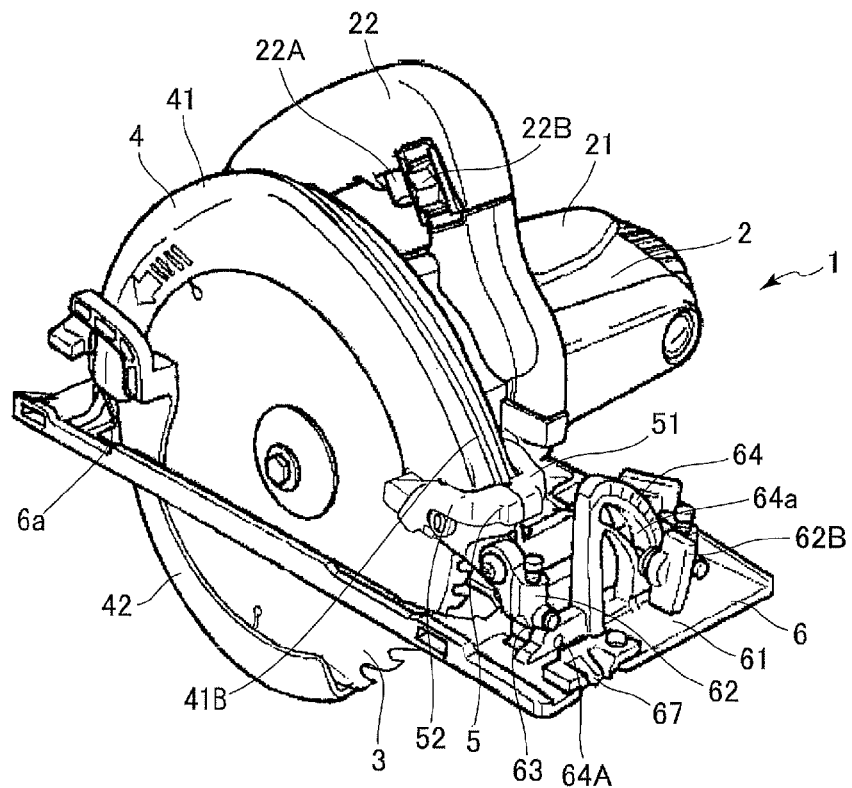
FIG. 1 is a perspective view showing a portable circular saw according to an embodiment of the present invention.

A portable cutting device according to an embodiment of the present invention will be described with reference to FIGS. 1 through 9. As shown in FIG. 1, a circular saw 1 as a portable cutting device mainly includes a housing 2, a circular saw blade 3, a saw cover 4, a light irradiation unit 5, and a base 6.

The housing 2 mainly includes a motor housing 21 and a handle 22. The motor housing 21 houses a motor (not shown). The handle 3 is formed integral with the motor housing 21. A driving system (not shown) driven by the motor is provided in the housing 2. The driving system is capable of rotating the circular saw blade 3.

Figure 3:
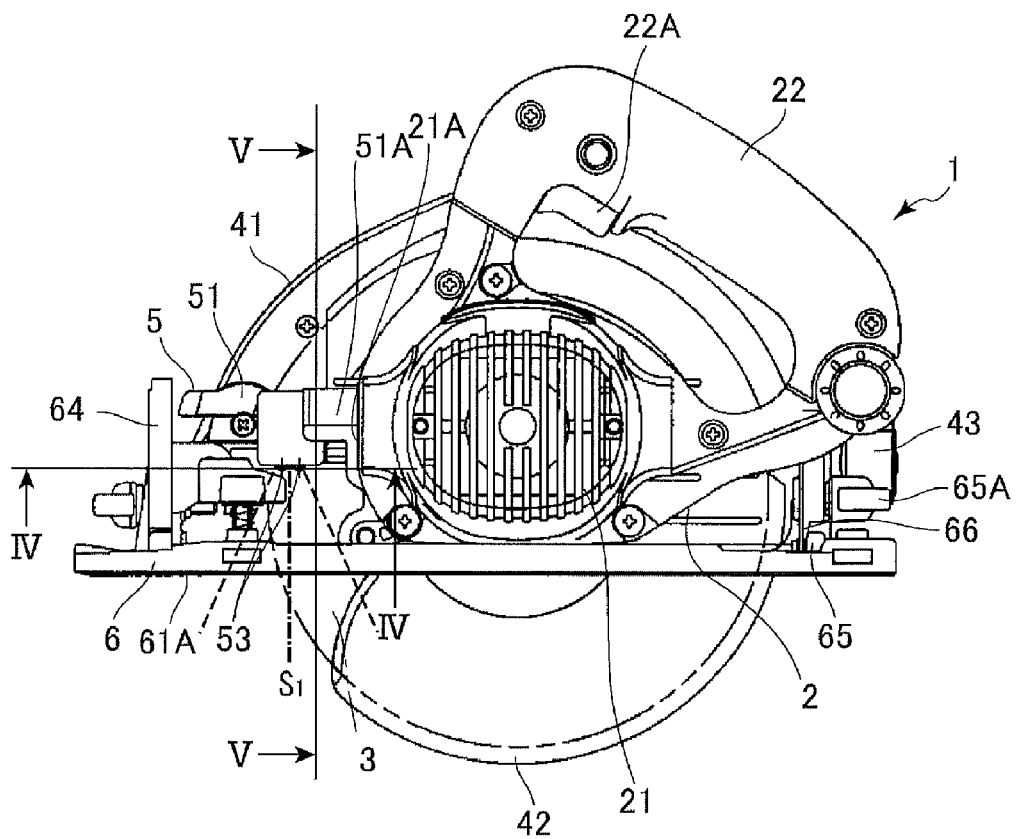
FIG. 3 is a side view of the portable circular saw from the housing side according to the embodiment of the present invention.

As shown in FIG. 1, the handle 22 is provided with a switch 22A for controlling driving of the motor, and an illumination switch 22B for controlling ON and OFF the light irradiation unit 5. As shown in FIG. 3, a connecting part 21A is provided near the handle 22 of the housing 2. An electric cable (not shown) connected to the illumination switch 22B is linked to the light irradiation unit 5 at the connecting part 21A.

Figure 2:
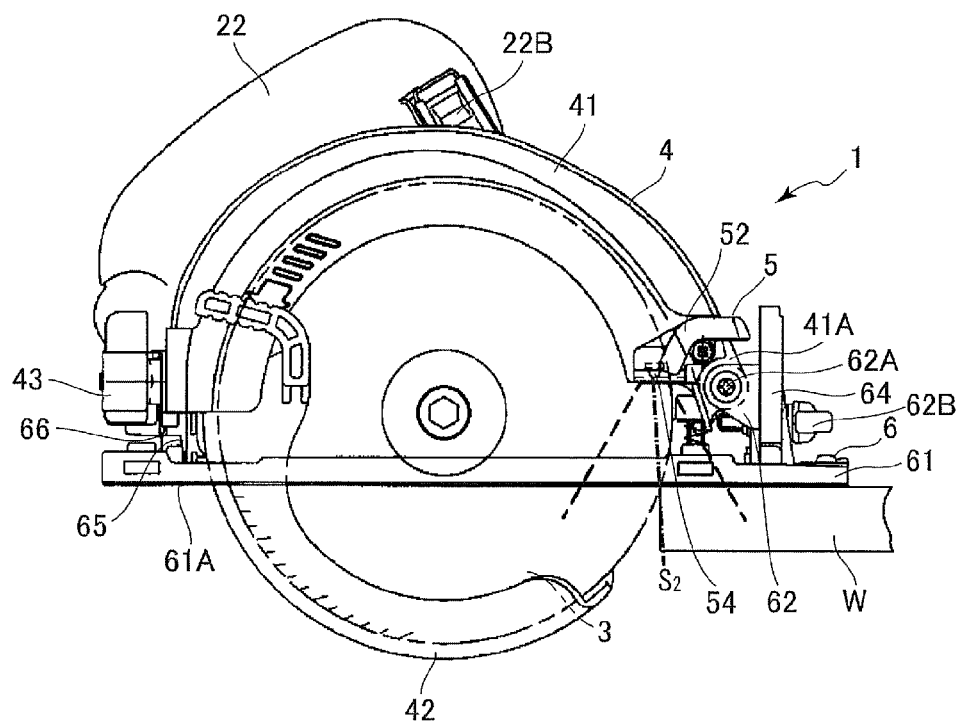
FIG. 2 is a side view of the portable circular saw from a opposite side of the housing according to the embodiment of the present invention.

The saw cover 4 is attached to the housing 2 on an opposite side of the handle 22 from the motor housing 21. As shown in FIG. 2, the saw cover 4 includes a saw blade housing section 41 and a safety cover 42. The saw cover 4 protects the circular saw blade 3 and covers the side surfaces of the circular saw blade 3. The saw blade housing section 41 is connected to the housing 2, and the safety cover 42 is attached to the saw blade housing section 41.

As shown in FIG. 2, the saw blade housing section 41 is made from metal and partially covers the upper half peripheral portion of the circular saw blade 3. The saw blade housing section 41 includes a connecting part 41A. The connecting part 41A is located on one end side (right end side in FIG. 2) of the saw blade housing section 41 in a circumferential direction. The connecting part 41A is connected to a pivot support portion 62 described later. A rib 41B is provided on the saw blade housing section 41 at a region where an imaginary plane extending along the circular saw blade 3 intersects the saw blade housing section 41. That is, the rib 41B is linearly aligned with the circular saw blade 3. On another end side of the saw blade housing section 41 in the circumferential direction (left end side in FIG. 2), a regulator 43 is provided on an extension of the rib 41B and is capable of coupling and releasing a link 66 described later to the saw cover housing section 41. The amount of protrusion of the circular saw blade 3 can be fixed by tightening the regulator 43.

On the another end side of the saw cover housing section 41, the safety cover 42 is provided along an outer periphery of the circular saw blade 3. The safety cover 42 is capable of rotating along the outer periphery of the circular saw blade 3 in the circumferential direction. A spring (not shown) is interposed between the saw cover housing section 41 and the safety cover 42. The safety cover 42 is urged by the spring in the circumferential direction of the saw cover housing section 41. FIGS. 1 and 2 show the initial state of the safety cover 42, where the most part of the safety cover 42 projects downward beyond the base 6 so as to prevent the outer periphery of the circular saw blade 4 from being exposed. A part of the circular saw blade 3 is exposed in the initial state of the safety cover 42. When a cutting operation is conducted, the exposed part of circular saw blade 3 in the initial state cuts a wood W described later. The circular saw 1 moves from the another end side toward the one end side of the saw cover housing section 41 during the cutting operation. Hence, the direction from the another end side toward the one end side of the saw cover housing section 41 is defined as a cutting direction. The one end side of the saw cover housing section 41 is defined as a front side in the cutting direction, as well as the another end side a rear side in the cutting direction.

As shown in FIGS. 1 and 2, the base 6 includes a base member 61, the pivot support portion 62, a first bevel plate 64, a second bevel plate 65, and a link 66 which serves as an adjust guide. The base 6 supports the housing 2, the circular saw blade 3, and the saw cover 4. The housing 2, the circular saw blade 3, and the saw cover 4 are capable of pivoting and tilting with respect to the base 6. The base member 61 is of a substantially rectangular plate made from metal. The longitudinal direction of the base member 61 is parallel to the cutting direction. The base member 61 is formed with an opening 6a through which the circular saw blade 3 and the safety cover 42 are projected downward beyond the contact surface 61A of the base member 61.

As shown in FIGS. 1 and 2, the first bevel plate 64 and the pivot support portion 62 are provided on the front side in the cutting direction of the opening 6a of the base member 61. As shown in FIG. 3, the first bevel plate 64 is provided on the base member 61 extending in a direction substantially perpendicular to the cutting direction. The first bevel plate 64 has a tilt shaft 64A extending in the cutting direction. The first bevel plate 64 is formed with an arc-shaped slit 64a on an imaginary circular line centered at the axial center of the tilt shaft 64A.

As shown in FIG. 1, the pivot support portion 62 is tiltably supported about the tilt shaft 64A. The pivot support portion 62 has a pair of arms extending toward the rear side in the cutting direction. The arms are provided with a pivot shaft 62A extending in a direction perpendicular to the cutting direction. The pivot shaft 62A pivotally supports the connecting part 41A at the front side in the cutting direction of the saw cover housing section 41.

The pivot support portion 62 is provided with a screw 62B. The first bevel plate 64 is engaged with the screw 62B inserted through the slit 64a. The screw 62B is engaged with a thread groove (not shown) formed in the pivot support portion 62. The angular position of the pivot support portion 62 is fixed by tightening the screw 62B. That is, the user can maintain an arbitrary tilt angle of the pivot support portion 62 with respect to the first bevel plate 64 (the base member 61) by tightening the screw 62B.

As shown in FIGS. 1 and 2, the second bevel plate 65 and the link 66 are provided on the rear side in the cutting direction of the opening part 6a of the base member 61. The second bevel plate 65 have a symmetrical shape to the first bevel plate 64 across the opening part 6a. An arc-shaped slit (not shown) is formed in the second bevel plate 65. A tilt shaft (not shown) is provided on an extension of the axial direction of the tilt shaft 64A. The tilt shaft (not shown) supports the link 66. A screw 65A is inserted through the slit (not shown) of the second bevel plate 65. The angular position of the link 66 with respect to the second bevel plate 65 can be fixed to an arbitrary angle by tightening the screw 65A.

Also as shown in FIG. 1, a pointer 67 is provided at a region where a leading edge of the base member 61 in the front side in the cutting direction intersects an imaginary plane extending along the circular saw blade 3. The pointer 67 indicates a cutting position on a cutting object. The base member 61 has the contact surface 61A which contacts a cutting object.

As shown in FIG. 1, the light irradiation unit 5 is provided on the front side in the cutting direction of the saw cover housing section 41 and the vicinity of the pivot support portion 62. The light irradiation unit 5 includes a first case 51 and a second case 52 which are made from resin. As shown in FIG. 1, the first case 51 is provided along the saw cover housing section 41 on the side providing the housing 2. One end portion of the first case 51 is located on the rib 41B. As shown in FIG. 3, the other end portion of the first case 51 is positioned radially inward the circular saw blade 3 as viewed from the axial direction of the circular saw blade 3. As shown in FIG. 1, the second case 52 is provided along the saw cover housing section 41 on the opposite side of the first case 51. One end portion of the second case 52 is located on the rib 41B. As shown in FIG. 2, the other end portion of the second case 52 is positioned radially inward the circular saw blade 3. Hence, the rib 41B is located on a boundary position between the first case 51 and the second case 52. With this construction, the light irradiation unit 5 can be configured to be compact. Further, as shown in FIG. 3, a link portion 51A is provided on the other end portion side of the first case 51. The link portion 51A is connected to the connecting part 21A. In the link portion 51A, an electric cable (not shown) wired inside the housing 2 is connected to an electric cable 55 wired inside the first case 51 and the second case 52 shown in FIG. 4. The electric cable 55 is wired inside the resin cases (the first case 51 and the second case 52) and is therefore not exposed outside. Accordingly, the electric cable 55 is protected from cutting and short to the saw cover 4 and the like.

Figure 4:
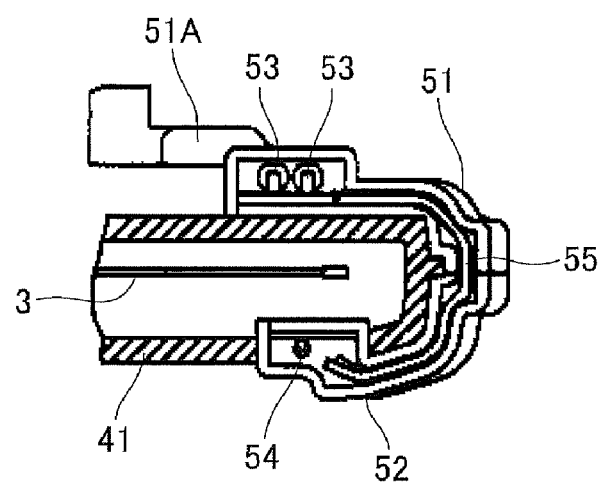
FIG. 4 is a detailed cross-sectional view along a line IV-IV in FIG. 3.

As shown in FIGS. 2 through 4, the other end portion of the first case 51 and the other end portion of the second case 52 of the light irradiation unit 5 are provided with a first irradiation device 53 and a second irradiation device 54, respectively. Hence, the first irradiation device 53 and the second irradiation device 54 are positioned radially inward of the circular saw blade 3 as viewed from the axial direction of the circular saw blade 3. That is, a distance between the first irradiation device 53 and the second irradiation device 54, and a center of the circular saw blade 3 in a radial direction of the circular saw blade 3 is shorter than a radius of the circular saw blade 3. The first irradiation device 53 includes two LEDs as light sources. The second irradiation device 54 includes one LED as a light source. Accordingly, light volume of the first irradiation device 53 on the side providing the housing 2 can be greater than that of the second irradiation device 54. As a result, a blade edge of the circular saw blade 3 in the side providing the housing 2 and a nearby area, which are generally dark region during cutting operation, are illuminated sufficiently.

Figure 5:
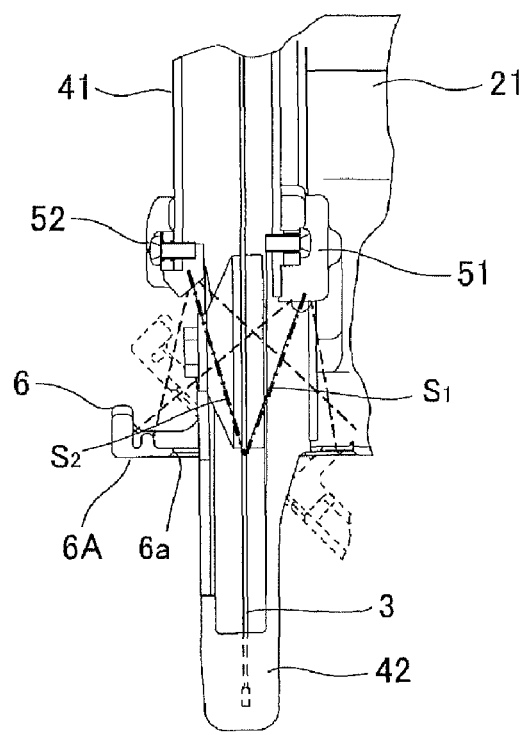
FIG. 5 is a detailed cross-sectional view along a line V-V in FIG. 3.
Figure 8:
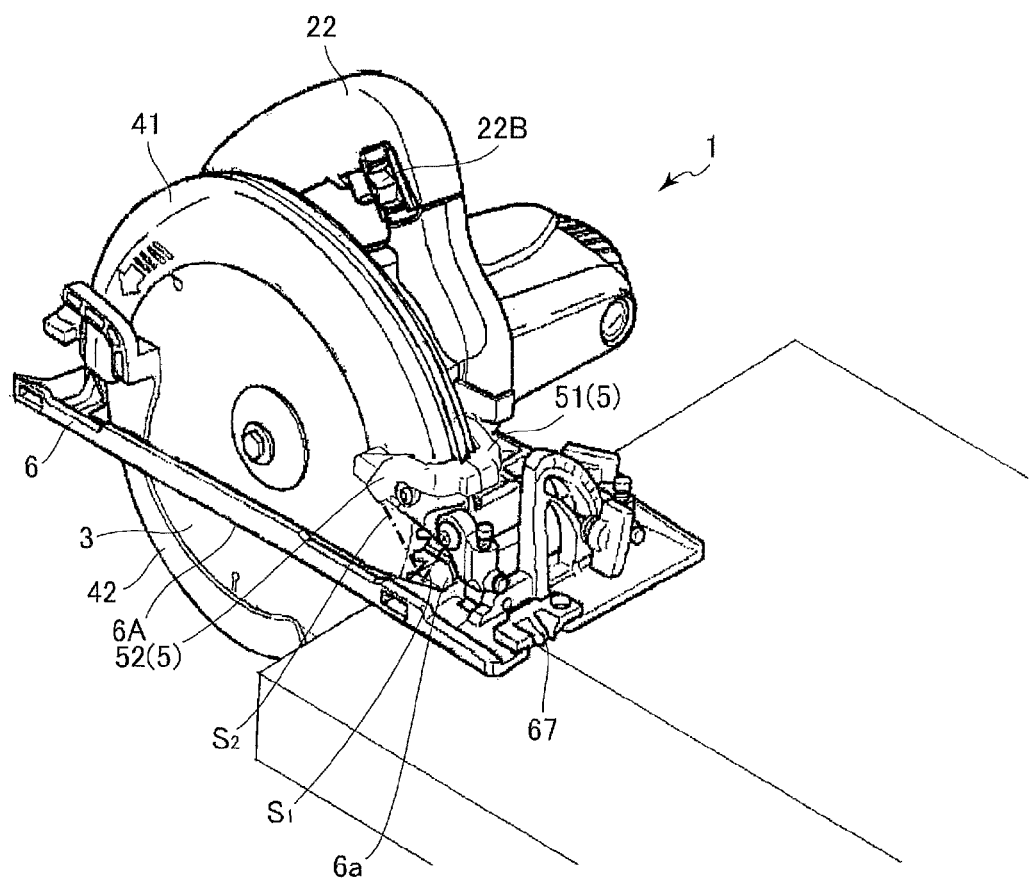
FIG. 8 is a perspective view showing the portable circular saw according to the embodiment of the present invention, when cutting operation is conducted.

As shown in FIG. 5, the first irradiation device 53 provides an optical axis S1, and the second irradiation device 54 provides an optical axis S2. The optical axes S1 and S2 are directed toward the blade edge of the circular saw blade 3. Therefore, as shown in FIGS. 2, 3, and 5, the first and second irradiation devices 53 and 54 can satisfactorily illuminate the wood W in the opening 6a (see FIG. 8) with light. Further, the first and second irradiation devices 53 and 54 can satisfactorily illuminate a region including a leading end portion of the circular saw blade 3 and a spot on the wood W. The spot is ahead of the leading end portion of the circular saw blade 3 in the cutting direction. According to a configuration as described above, the optical axes S1 and S2 of the first and second irradiation devices 53 and 54 cross each other at the front side of the circular saw blade 3 in the cutting direction, as shown in FIGS. 5 and 8, thereby suppressing shadows formed by the circular saw blade 3. Accordingly, visibility of a marking line and the like drawn on the wood W can be securely ensured, and operating efficiency can be improved.

Figure 6:
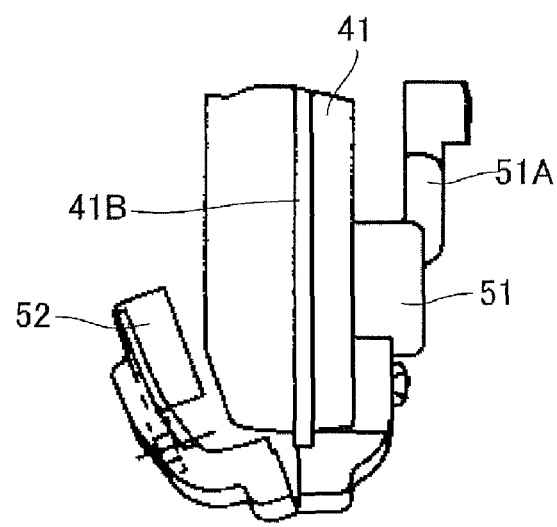
FIG. 6 is a view showing a procedure for attaching a light irradiation unit of the portable circular saw according to the embodiment of the present invention.
Figure 7:
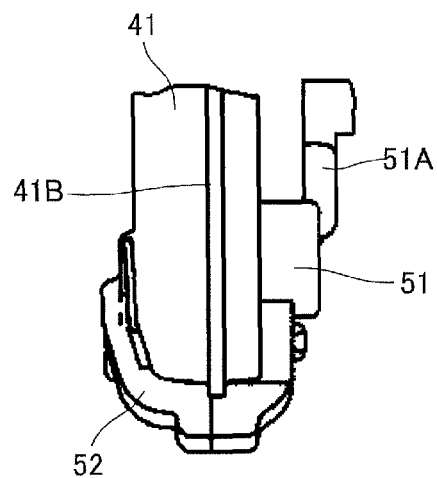
FIG. 7 is a view showing a state in which the light irradiation unit has been attached to the portable circular saw according to the embodiment of the present invention.

When attaching the light irradiation unit 5 to the saw cover housing section 41, the first case 51 is firstly attached to the saw cover housing section 41 by screws or the like as shown in FIG. 6, with the housing 2 and the saw cover housing section 41 joined to each other. Thereafter, as shown in FIG. 7, the second case 52 is attached to the saw cover housing section 41 also by screws or the like. The resin cases constituting the light irradiation unit 5 are separated into the first case 51 and the second case 52 at the rib 41B as the boundary position located substantially on the imaginary plane extending along the circular saw blade 3. That is, the first case 51 and the second case 52 define a parting face therebetween. The parting face is linearly aligned with the circular saw blade 3. Therefore, the first case 51 and the second case 52 can be easily attached to the saw cover housing section 41 without being interfered by the rib 41B.

Figure 9:
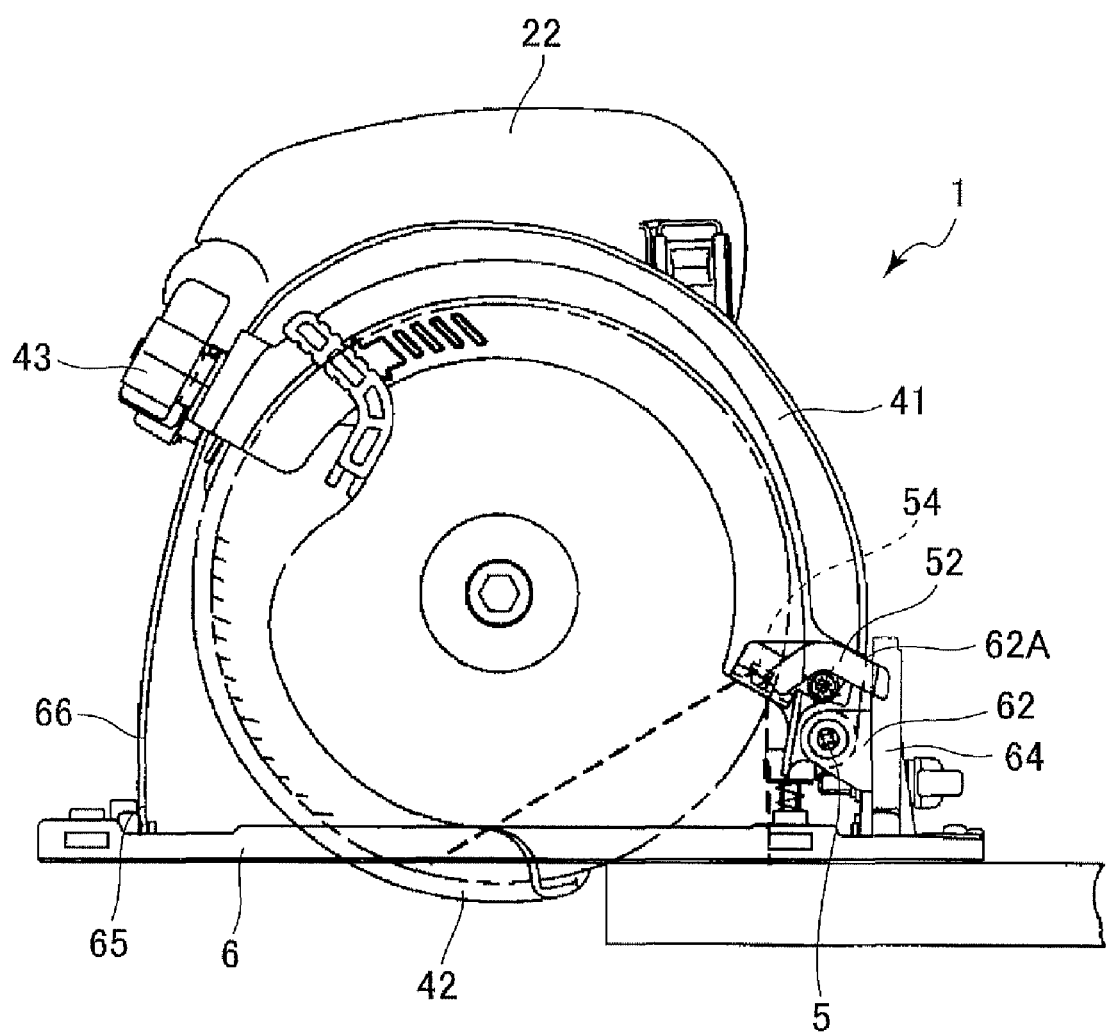
FIG. 9 is a side view of the portable circular saw from the opposite side of the housing according to the embodiment of the present invention, when an amount of protrusion of a circular saw blade has been changed.

If the saw cover 4 is pivoted with respect to the base 6 to change amount of protrusion of the circular saw blade 3 from the base 6 according to the thickness of the wood W, the light irradiation unit 5 is pivoted with the saw cover 4 so that the optical axes S1 and S2 of the first and second irradiation devices 53 and 54 are displaced accordingly. However, the light irradiation unit 5 is provided the vicinity of the pivot support portion 62. Therefore, displacement of the optical axes S1 and S2 of the first and second irradiation devices 53 and 54 are small. Accordingly, the circular saw blade 3 and the wood W can be illuminated satisfactorily by the light irradiation unit 5 even if the protrusion amount of the circular saw blade 3 is changed as shown in FIG. 9.

What is claimed is:

1. A portable circular saw comprising:
   a housing;
   a motor accommodated in the housing;
   a circular saw blade driven by the motor for cutting a cutting object in a cutting direction, the circular saw blade having one side surface and another side surface and further having a frontmost point in the cutting direction and a cutting point that cuts and intersects with the cutting object;
   a saw cover provided to the housing for partially covering the circular saw blade;
   a base pivotally movably supporting the housing and the saw cover and having a contact surface that contacts the cutting object, the circular saw blade protruding through the contact surface;
   a protrusion amount changing mechanism provided on the base for changing an amount of protrusion of the circular saw blade from the contact surface and comprising a pivot support portion provided on a front section of the base in the cutting direction for pivotally movably supporting the housing and the saw cover with respect to the base to change the amount of protrusion; and
   a light irradiation unit provided on the saw cover and comprising comprising:
      a first irradiation device located on the one side surface side of the circular saw blade, and
      a second irradiation device located on the another side surface side of the circular saw blade,
      wherein the light irradiation unit emits a light from both sides of the circular saw blade to illuminate a region including a leading end portion of the circular saw blade and a spot on the cutting object,
         the leading end portion being a portion that is radially inward of the circular saw blade, that is, a distance between a center of the circular saw blade and the leading end portion in a radial direction of the circular saw blade is shorter than a radius of circular saw blade, at a front side in the cutting direction of the circular saw blade, and
         the spot being a portion that is radially outward of the circular saw blade, that is, a distance between the center of the circular saw blade and the spot in the radial direction of the circular saw blade is greater than the radius of the circular saw blade,
      wherein the spot is located ahead of the leading end portion in the cutting direction and includes at least an area that is positioned below a portion of the circular saw blade between the frontmost point and the cutting point, and
      wherein the light irradiation unit is disposed between the center of the circular saw blade and the pivot support portion of the protrusion amount changing mechanism.

2. The portable circular saw according to claim 1, wherein the light irradiation unit is positioned adjacent to the pivot support portion, and
   wherein the light irradiation unit is configured to emit the lights to illuminate the region regardless of a change in the amount of protrusion.

3. The portable circular saw according to claim 2, further comprising means to pivot the light irradiation unit when the saw cover moves to displace optical axes of the first and second irradiation devices in correspondence with movement of the saw cover to continue to illuminate said region regardless of the change in the amount of protrusion.

4. The portable circular saw according to claim 1, wherein the protrusion amount changing mechanism further comprises:
   a regulator provided on a rear section of the base in the cutting direction and capable of fixing and releasing a pivot position of the housing and the saw cover with respect to the base, the light irradiation unit being positioned in the vicinity of the pivot support portion.

5. The portable circular saw according to claim 1, wherein the first irradiation device and the second irradiation device are positioned radially inward of the circular saw blade.

6. The portable circular saw according to claim 1, wherein the saw cover has one side wall that covers the one side surface of the circular saw blade and another side wall that covers the another side surface of the circular saw blade, and
   wherein the light irradiation unit comprises a resin case bridging between the one side wall and the another side wall, the resin case having one end section at the one side wall and another end section at the another side wall, the first irradiation device being provided on the one end section, and the second irradiation device being provided on the another end section.

7. The portable circular saw according to claim 6, wherein the resin case comprises a first case positioned at the one side wall and a second case positioned at the another side wall.

8. The portable circular saw according to claim 7, wherein the first case and the second case define a parting face therebetween, the parting face being linearly aligned with the circular saw blade.

9. The portable circular saw according to claim 7, wherein the first irradiation device and the second irradiation device provides a first optical axis and a second optical axis respectively, the first optical axis and the second optical axis being directed toward a blade edge of the leading end portion of the circular saw blade.

10. The portable circular saw according to claim 1, wherein the motor is located on the one side surface side of the circular saw blade, and
    wherein the first irradiation device includes a plurality of first light sources, and the second irradiation device includes at least one second light source, the number of the first light sources being greater than that of the at least one second light source.

11. The portable circular saw according to claim 1, wherein the first irradiation device and the second irradiation device are arranged, relative to one another, so that optical axes of the first and second irradiation devices cross each other at a front side of the circular saw blade to thereby suppress shadows from the circular saw blade.

12. A portable circular saw comprising:
    a housing;
    a motor accommodated in the housing;
    a circular saw blade driven by the motor for cutting a cutting object in a cutting direction, the circular saw blade having one side surface and another side surface and further having a frontmost point in the cutting direction and a cutting point that cuts and intersects with the cutting object;
    a saw cover provided to the housing for partially covering the circular saw blade;
    a base pivotally movably supporting the housing and the saw cover and having a contact surface that contacts the cutting object, the circular saw blade protruding through the contact surface,
    a protrusion amount changing mechanism provided on the base for changing an amount of protrusion of the circular saw blade from the contact surface and comprising a pivot support portion provided on a front section of the base in the cutting direction for pivotally movably supporting the housing and the saw cover with respect to the base to change the amount of protrusion; and
    a light irradiation unit provided on the saw cover and comprising
        a first irradiation device located on the one side surface side of the circular saw blade, and
        a second irradiation device located on the another side surface side of the circular saw blade,
        wherein the light irradiation unit emits a light from both sides of the circular saw blade to illuminate a region including a leading end portion of the circular saw blade and a spot on the cutting object,
            the leading end portion being a portion that is radially inward of the circular saw blade, that is, a distance between a center of the circular saw blade and the leading end portion in a radial direction of the circular saw blade is shorter than a radius of circular saw blade, at a front side in the cutting direction of the circular saw blade, and
            the spot being a portion that is radially outward of the circular saw blade, that is, a distance between the center of the circular saw blade and the spot in the radial direction of the circular saw blade is greater than the radius of the circular saw blade,
        wherein the spot is located ahead of the leading end portion in the cutting direction and includes at least an area that is positioned below a portion of the circular saw blade between the frontmost point and the cutting point; and
    means for suppressing shadows formed by the circular saw blade, said means comprising arranging the first irradiation device and the second irradiation device between the center of the circular saw blade and the pivot support portion of the protrusion amount changing mechanism, and relative to one another, so that optical axes of the first and second irradiation devices cross each other at a front side of the circular saw blade to thereby suppress shadows from the circular saw blade.

13. A portable circular saw comprising:
    a housing;
    a motor accommodated in the housing;
    a circular saw blade driven by the motor for cutting a cutting object in a cutting direction, the circular saw blade having one side surface and another side surface and further having a frontmost point in the cutting direction and a cutting point that cuts and intersects with the cutting object;
    a saw cover provided to the housing for partially covering the circular saw blade;
    a base pivotally movably supporting the housing and the saw cover and having a contact surface that contacts the cutting object, the circular saw blade protruding through the contact surface;
    a protrusion amount changing mechanism provided on the base for changing an amount of protrusion of the circular saw blade from the contact surface and comprising a pivot support portion provided on a front section of the base in the cutting direction for pivotally movably supporting the housing and the saw cover with respect to the base to change the amount of protrusion; and
    a light irradiation unit provided on the saw cover and comprising
        a first irradiation device located on the one side surface side of the circular saw blade and
        a second irradiation device located on the another side surface side of the circular saw blade,
        wherein the light irradiation unit emits a light from both sides of the circular blade to illuminate a region including a leading end portion of the circular saw blade and a spot on the cutting object,
            the leading end portion being a portion that is radially inward of the circular saw blade, that is, a distance between a center of the circular saw blade and the leading end portion in a radial direction of the circular saw blade is shorter than a radius of circular saw blade, at a front side in the cutting direction of the circular saw blade, and
            the spot being a portion that is radially outward of the circular saw blade, that is, a distance between the center of the circular saw blade and the spot in the radial direction of the circular saw blade is greater than the radius of the circular saw blade,
        wherein the spot is located ahead of the leading end portion in the cutting direction and includes at least an area that is positioned below a portion of the circular saw blade between the frontmost point and the cutting point;

wherein the housing, including the motor, is located on the one side surface side of the circular saw blade, said portable circular saw further comprising:

means for providing more light on said one side surface side where the housing is located than on said another side, said means comprising:

the first irradiation device including a plurality of first light sources, and the second irradiation device including at least one second light source, wherein the number of the first light sources being greater than that of the at least one second light source, wherein the light irradiation unit is disposed between the center of the circular saw blade and the pivot support portion of the protrusion amount changing mechanism.

14. The portable circular saw according to claim 13, wherein the first irradiation device and the second irradiation device are arranged, relative to one another, so that optical axes of the first and second irradiation devices cross each other at a front side of the circular saw blade to thereby suppress shadows from the circular saw blade.

15. A portable circular saw comprising:
a housing;
a motor accommodated in the housing;
a circular saw blade driven by the motor for cutting a cutting object in a cutting direction, the circular saw blade having one side surface and another side surface and further having a frontmost point in the cutting direction and a cutting point that cuts and intersects with the cutting object;
a saw cover provided to the housing for partially covering the circular saw blade; and
a base pivotally movably supporting the housing and the saw cover and having a contact surface that contacts the cutting object, the circular saw blade protruding through the contact surface;
a protrusion amount changing mechanism provided on the base for changing an amount of protrusion of the circular saw blade from the contact surface and comprising a pivot support portion provided on a front section of the base in the cutting direction for pivotally movably supporting the housing and the saw cover with respect to the base to change the amount of protrusion; and
a light irradiation unit provided on the saw cover and comprising
a first irradiation device located on the one side surface side of the circular saw blade, and
a second irradiation device located on the another side surface side of the circular saw blade,
wherein the light irradiation unit emits a light from both sides of the circular saw blade to illuminate a region including a leading end portion of the circular saw blade and a spot on the cutting object,
the leading end portion being a portion that is radially inward of the circular saw blade, that is, a distance between a center of the circular saw blade and the leading end portion in a radial direction of the circular saw blade is shorter than a radius of circular saw blade, at a front side in the cutting direction of the circular saw blade, and
the spot being a portion that is radially outward of the circular saw blade, that is, a distance between the center of the circular saw blade and the spot in the radial direction of the circular saw blade is greater than the radius of the circular saw blade,
wherein the spot is located ahead of the leading end portion in the cutting direction and includes at least an area that is positioned below a portion of the circular saw blade between the frontmost point and the cutting point;
wherein the first irradiation device and the second irradiation device are positioned radially inward of the circular saw blade as viewed in an axial direction of the circular saw blade, and
wherein the light irradiation unit is disposed between the center of the circular saw blade and the pivot support portion of the protrusion amount changing mechanism.

16. The portable circular saw according to claim 15, wherein the first irradiation device and the second irradiation device are arranged, relative to one another, so that optical axes of the first and second irradiation devices cross each other at a front side of the circular saw blade to thereby suppress shadows from the circular saw blade.

* * * * *